United States Patent
Adachi et al.

(10) Patent No.: US 7,272,390 B1
(45) Date of Patent: Sep. 18, 2007

(54) METHOD AND SYSTEM FOR SENDING FACSIMILE TRANSMISSIONS FROM MOBILE DEVICES

(75) Inventors: Stephen Adachi, Santa Clara, CA (US); Tin Le, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 09/741,316

(22) Filed: Dec. 19, 2000

(51) Int. Cl.
*H04Q 7/20* (2006.01)

(52) U.S. Cl. .............................. 455/426.1; 455/422.1; 455/550.1; 455/552.1; 455/412.1; 379/88.11; 379/88.12

(58) Field of Classification Search ............. 455/426.1, 455/422.1, 550.1, 552.1, 412.1; 379/88.11, 379/88.12, 88.13
See application file for complete search history.

(56) References Cited

U.S. PATENT DOCUMENTS

| | | | | |
|---|---|---|---|---|
| 5,524,047 | A * | 6/1996 | Brown et al. ............. | 379/93.11 |
| 6,405,037 | B1 * | 6/2002 | Rossmann ................ | 455/426.1 |
| 6,501,956 | B1 * | 12/2002 | Weeren et al. .............. | 455/463 |
| 6,553,240 | B1 * | 4/2003 | Dervarics ................... | 455/566 |
| 6,625,447 | B1 * | 9/2003 | Rossmann ............. | 340/825.27 |
| 6,650,889 | B1 * | 11/2003 | Evans et al. ............. | 455/412.1 |
| 6,775,026 | B1 * | 8/2004 | Kato ......................... | 358/1.15 |
| 6,865,191 | B1 * | 3/2005 | Bengtsson et al. .......... | 370/475 |
| 2002/0113994 | A1 * | 8/2002 | Smith et al. ............... | 358/1.15 |
| 2003/0013458 | A1 * | 1/2003 | Yabe et al. ................. | 455/456 |

* cited by examiner

*Primary Examiner*—Matthew Anderson
*Assistant Examiner*—Minh Dao
(74) *Attorney, Agent, or Firm*—Marger Johnson & McCollom, P.C.

(57) ABSTRACT

A system and method for sending facsimile transmissions from mobile devices via web servers wherein a mobile device receives and displays a limited subset of available data on an installed display, a user decides to receive more information than is possible to display on the mobile device display, in hard copy format at a certain locus or elsewhere. The information is ordered using the mobile device and received from the server by facsimile transmission via any facsimile system at any telephone number specified. By this system and method, any facsimile system anywhere becomes an accessible printer. Further, screen snapshots of the limited data appearing on mobile digital communication device displays, complete reproductions of unlimited data represented on the mobile device, and other information specified via the mobile device, including webpages may be reproduced in hard copy format by facsimile transmission.

34 Claims, 8 Drawing Sheets

METHOD AND SYSTEM FOR SENDING FACSIMILE TRANSMISSIONS FROM MOBILE DEVICES

BACKGROUND OF THE INVENTION

1. Field of the Invention

The present invention relates to the field of mobile communications devices such as digital cellular telephones, wireless access protocol (WAP) devices, personal digital assistants, portable web browsers, portable computers, and two-way pagers. Specifically, the present invention relates to a system and method for sending information, including but not limited to web-based information, under control through a mobile device to any facsimile (Fax) system.

2. Related Art

As electronic components required for wireless communications devices have reduced in size, portability of such devices has been enhanced. This portability has led to the development of readily portable wireless communications devices, including a host of mobile devices. As mobile wireless digital communication devices have advanced and proliferated, they are being used in a range of applications wherein they are retrieving and displaying information. One of the more widely used mobile wireless digital communication devices which is being used to retrieve and display information is the digital cellular telephone. Other mobile wireless communication devices with such information retrieval and display capability include personal digital assistants (PDA), portable computers, portable web browsers, wireless access protocol (WAP) devices, and two-way pagers.

Digital cellular telephones and other such mobile wireless digital communications devices may incorporate integral display capability. Such integral display capability may reside in a screen, which may be a flat panel display screen typified by such display mechanisms as a liquid crystal display (LCD), a field emission display, also called a flat panel CRT (cathode ray tube), or other display mechanism suitable for generating alphanumeric characters and graphic images recognizable to the user. In order to maximize their portability, mobile digital communications devices may include components selected for combining characteristics such as small size, ruggedness, and low power consumption. This may include the display mechanism components. Such display mechanism components may be thin, have small dimensions, and may also have a relatively small area, including their actual display area.

Mobile wireless digital communications devices may communicate via the Internet with servers. Such servers have the capabilities to communicate with other devices, to access information, and to respond to direction communicated by the mobile devices. Communicating with these servers, the mobile devices have access to all of the information the server may have access to. This capability markedly enhances the scope of utility of mobile devices.

The enhancement of application capability of mobile devices has faced certain constraints. These constraints include an inability of mobile devices to fully and adequately present the information they may access through a server to the user. One limitation of mobile devices contributing to this constraint results from the small screen size of the display mechanism. The small display screens may have a limited area. Consequently, the alphanumeric characters or images that may be displayed thereon may be restricted. The small screen area itself may present a limitation to information display capability. Only so much information may be displayed in any finite area, yet the display screen of a mobile device is small by design. The constraints presented by their small screens may lead users of mobile devices to desire more of the information available through accessible servers than the mobile devices may be capable of presenting.

Mobile devices are carried and used anywhere. Access to information is thus made available anywhere also, including the plethora of information available through serves a mobile device may access. In some circumstances, users of mobile devices may want hard copies of information displayed on their mobile device screen. However, they may be someplace or in some circumstance in which they do not have access to a printer. For example, a salesperson may be in a mobile vehicle, or at a client's site, speaking via a cellular digital telephone with an office across the country, or interacting with a company website. In response to a query regarding the status of an order, they receive from the office or server the shipping data for two or three items on the mobile device display screen. The user may desire a hard copy of this data. The user is constrained by these circumstances to transcribing the information appearing on the mobile device screen by manual writing. Thus, there may be no convenient way for this user to obtain a hard copy of information displayed on a mobile device screen.

Further, a user of a mobile device may personally be satisfied in a certain circumstance with the limited subset of information, distilled from the great quantity of related information available on the server with which the mobile device is interacting, displayed on his mobile device screen. However, the user may want to send a hard copy of the entire available related information to another destination. For example, the salesperson above may be satisfied with knowing the shipping date the cellular digital telephone screen displays as he drives in a vehicle, but a customer requests a hard copy of the entire order, with prices, quantities, descriptions, shipping charges, shipping destination, insurance data, delivery dates, plants or origin, taxes, and a host of related information from the order document, in addition to the shipping data. Another example may be a teach on a field trip with a class. In response to a question by a student, the teacher accesses a website via a server over a mobile device such as a cellular telephone or portable web browser. She is able to obtain enough information to answer the question from her mobile device screen, but desires a hard copy of the entire webpage for later reference.

In the prior art, one method of circumventing the problem presented by the limited information display capabilities of mobile devices has been to increase the size of the screens. However, this may consequently increase the size and weight of the mobile devices themselves, with adverse affect on portability.

A second method has been to reduce the size of the images displayed to fit more information on the same small screen area. However, this may be adverse to a user's ability to see the information that is being displayed on the screen of a mobile device. For example, the font size of alphanumeric characters spelling words or forming numbers being displayed on a screen may be reduced, but beyond a certain size reduction, they may become illegible unless a separate magnifier is used. This may be cumbersome and inconvenient, and may lead to other problems, such as losing or forgetting a magnifier, or an inability of different users with incompatible eyesights to use the same magnifier. Further, display screen mechanisms in mobile devices may be limited by their own construction or operating characteristics in their abilities to images with meaningful detail. This limitation may be a factor of their resolution, also limited by their small size in a mobile device.

One method in the prior art of producing hard copies of information displayed on mobile device screens has been simple transcription by hand of the information. For example, a user communicating on a cellular digital telephone while mobile may attempt to write the displayed information down on a notepad. However, this is grossly inconvenient. Handwriting while mobile may prove illegible. Also, pens and/or pads may not be conveniently accessible just when needed most for this purpose. Further, notes so written may easily be misplaced. Further still, using a mobile device while attempting to find a pad and pen, reading the screen, writing a legible transcription of the information displayed on the screen, may be disconcerting. Also, if more information than a few simple lines of data is being accessed, it may be inconvenient to write it all down manually under the best of circumstances.

The problem of generating hard copies of the greater amounts of information available through the server to which mobile devices are connected has been dealt with in the prior art in one way by finding other resources or obtaining assistance from other persons with access to such resources. For example, the teach desiring a hard copy of a particular webpage accessed via a cellular digital telephone or other mobile devices and a server while on a field trip could have to note the uniform resource locator (URL) of the website of interest, find a computer with both Internet and printer access, or a web browser and a printer, access the website in interest a second time from the computer or browser, and have that machine print the website on an associated printer. Alternatively, she could call another person, and if they were available and not otherwise occupied, they could be given the URL identity over the phone and asked to access it, download it, and print it, and then transmit the printed copy by facsimile machine to a facsimile machine the teacher had access to at that location. Another example is the salesperson responding to the request of a customer for a complete copy of the order off of which the status was just reported by a server on the cellular digital telephone or other mobile device screen. He may have to discommunicate with the server and his customer, call someone in his office, who may or may not be available, and describe the needed information and where it can be found, request that they send the specified information to the customer by facsimile transmission, e-mail attachment, or by some similar medium, and have to tell them the customer's facsimile machine telephone number or e-mail address, etc. This solution is inconvenient and inefficient.

Thus, the solutions to the problems of insufficient information on mobile device displays and producing hard copies of either the limited information on the mobile device screens or of the greater amounts of related information from which the mobile device screen display was distilled are inconvenient, inefficient, and impractical.

SUMMARY OF THE INVENTION

Accordingly, what is needed is a system and method that can provide a user of a mobile device with more information than the mobile device is capable of displaying, allow the user to access various types of information from any information source, and provide the user with the a capability of downloading information from a mobile device into hard copy anywhere while not limiting mobility. The present invention provides a novel solution to these needs.

In one embodiment of the present invention, a method is executed by a server, communicating with a mobile device. The server retrieves and communicates information by first receiving an instruction from the mobile device identifying information to be communicated, formatting that information for facsimile transmission compatibility, and transmitting the information to a facsimile system. The server may also format the information for compatibility with the mobile device and send the information to the mobile phone.

In another embodiment, a server system is described which has the capability to communicate with a mobile device, retrieve information, and communicate the information by first receiving an instruction from the mobile device identifying information to be communicated, formatting that information for facsimile transmission compatibility, and transmitting the information to a facsimile system. The system may also format the information for compatibility with the mobile device and send the information to the mobile phone.

In another implementation of the present invention, a method is executed by a mobile device which has the capability to communicate with a server system. The communications between the mobile device and the server may be wireless, and enabled by any existing wireless technology, including but not limited to radio, microwave, infrared, optical, or other electromagnetic or telephonic medium, or technology yet to be developed. In this implementation, a mobile device sends a request for information to a server and receives the information in response, displays the information, and instructs the server to transmit the information to a facsimile system, which is designated by the mobile device. The information to be transmitted by facsimile may be simply what is displayed on the mobile device display screen. Alternatively, it may be the entire corpus of information available at or to the server, corresponding to the information displayed on the mobile device screen.

It is further appreciated that the present invention enables the transmission of information by facsimile to any facsimile system at any telephone number, anywhere. Thus, the present invention enables any facsimile system to become an accessible printer to and for any mobile device implementing an embodiment of the present invention.

The present invention encompasses systems and methods for sending facsimile transmissions from mobile devices via a web server or other server. A mobile device such as a digital cellular telephone, personal digital assistant (PDA), portable computer, portable web browser, two way pager, etc., receives and displays to a user a limited subset of available data on an installed display. The user decides to receive more information than is possible to display on the mobile device display, in hard copy format. Reception may be at a certain locus or such information may be sent to another locus. The user inputs a fax command to the mobile device and receives such additional information from the server by facsimile transmission via any facsimile machine at any telephone number specified. By an embodiment of this invention, any facsimile system anywhere becomes an accessible printer device for any mobile device anywhere. An embodiment of the present invention allows the information to be reproduced in hard copy format by facsimile transmission to the specified facsimile system by a server, which is in communication with the device. Such communication may be via the Internet.

Screen snapshots of the limited data appearing on mobile device displays, complete reproductions of unlimited data represented by the mobile device display images, and other information specified via the mobile digital communication device may constitute the information. What may be sent includes webpages, which may be designated by their URLs, designated PDF files, e-mail to text displays, and voice to text displays, or any other electronically formattable data.

These and other objects and advantages of the present invention will become obvious to those of ordinary skill in the at after reading the following detailed description of the preferred embodiments which are illustrated in the drawing figures.

DETAILED DESCRIPTION OF THE INVENTION

Figure 1:
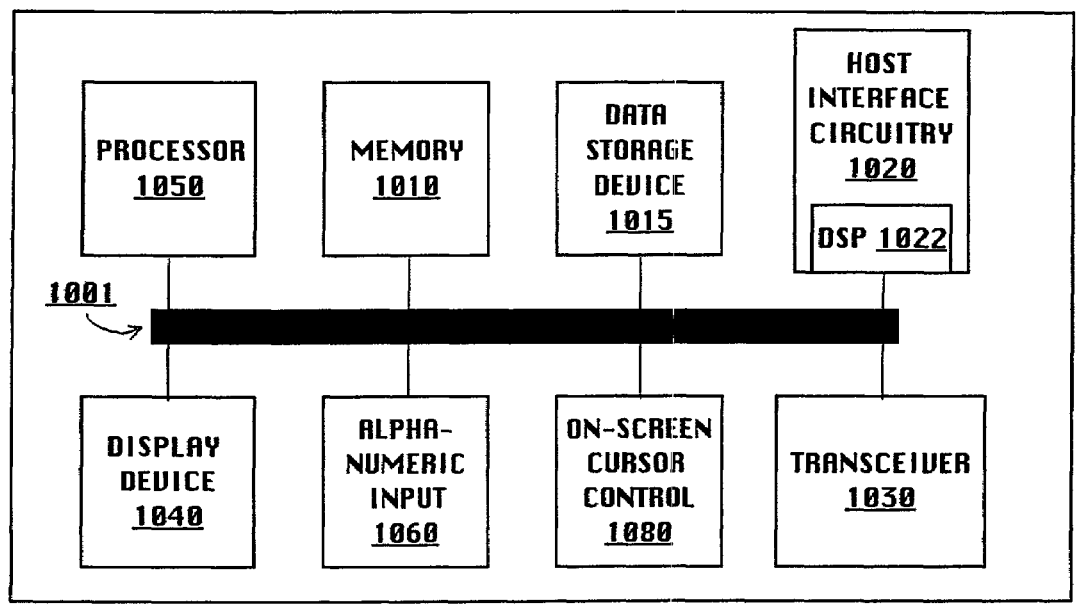
FIG. 1 is a block diagram of a server system for performing the steps in the method of one embodiment of the present invention.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals are bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "commanding" or "communicating" or "coupling" or "designating" or "displaying" or "formatting" or "informing" or "instructing" or "networking" or "performing" or "processing" or "receiving" or "retrieving" or "sending" or "transmitting" or the like, refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display devices.

The present invention is discussed primarily in the context of a portable or mobile digital communication system, such as a cellular digital telephone or personal digital assistant, with the capability to access data on servers through connection via compatible interfaces, such as wireless networks on the Internet. However, it is appreciated that the present invention can be used with other types of devices that have the capability to access some type of server, central device or central site, including but not limited to computer systems including but not limited to desktop, laptop and portable computers, wireless access protocol (WAP) devices, portable Web browsers, Web based televisions, mobile digital radios, two-way pagers, and personal communication systems. Further, it is appreciated that facsimile reproduction can be accomplished by facsimile systems such as FAX machines, as well as printers, document centers, and other document reproduction and other reproduction systems connected to computers or other communications systems.

EXEMPLARY MOBILE DEVICE—SERVER FACSIMILE TRANSMISSION SSYSTEM

Exemplary Server

FIG. 1 is a block diagram depicting an exemplary server system for implementing embodiments of the present invention. Server system 103 hosts a processor 1050 which implements the processes enabling the present invention. In the present embodiment, server system 103 is any type of intelligent electronic system (e.g., a desktop or other computer system, a computer network, communication system or network, a data center, etc.). However, it is appreciated that the present invention may also be implemented utilizing any other vehicle server architecture, or by any functional equivalent.

Continuing with reference to FIG. 1, server system 103 includes an address/data bus 1001 for communicating information, a central processor 1050 coupled with the bus 1001 for processing information and instructions, and a memory unit 1010 (e.g., random access memory and/or read only memory) and a data storage system 1015 coupled with the bus 1001 for storing information and instructions. Data storage system 1015 may be any magnetic and/or optical disc and drive/reader, or any other data storage device. In one implementation of the present invention, the methods described, including but not limited to enabling server communication and interaction with mobile devices (e.g., instruction, command, control, input, formatting and sending, etc.), server information retrieval (e.g., conversion, formatting, sending, transmitting, etc.), and server communication with facsimile systems (e.g., formatting and sending), are executed by processor 1050, which may be an application specific integrated circuit (ASIC). Alternatively, these methods may be implemented by processor 1050 executing a program stored in memory 1010 and/or data storage system 1015. It is appreciated that server system 103 may implement the invention by combinations of these schemes, or by alternatives other than those pictured. It is appreciated that server system 103 can include other elements not shown. It is further appreciated that server system 103 may be constituted by any functional equivalent, or by any viable alternative architecture.

In the present embodiment, server system 103 also optionally contains a display device 1040 coupled to the bus 100 for displaying information to system operators. The display device 1040 utilized with system 1000 may be a liquid crystal display (LCD) device, a cathode ray tube (CRT), a field emission display device (also called a flat panel CRT), or other display device suitable for generating graphic images and alphanumeric characters recognizable to the operators.

Server system 103 also includes a communications device 1030, which is coupled to bus 1001 for providing a communication link between server system 103 and other systems. Communications device 1030 may enable network interactions, Internet connections, wireless communications, and links with various communication modalities.

In one embodiment, server system 103 of FIG. 1 includes host interface circuitry 1020 coupled to bus 1001. Host interface circuitry 1020 includes an optional digital signal processor (DSP) 1022 for processing data to be transmitted or data that are received via communications device 1030. Alternatively, processor 1050 can perform some or all of the functions performed by DSP 1022.

Also included in server system 103 is an optional alphanumeric input device 1060. Alphanumeric input device 1060 can communicate information and command selections to processor 1050 via bus 1001. In one implementation, alphanumeric input device 1060 is a keyboard.

Server system 103 also includes an optional cursor control or directing device (on-screen cursor control 1080) coupled to bus 1001 for communicating operator input information and command selections to processor 1050. In one implementation, on-screen cursor control 1080 is a trackball, mouse, joystick or special keys on alphanumeric input device 1060 capable of signaling movement of a given direction or manner of displacement. It is to be appreciated that the on-screen cursor control 1080 also may be directed and/or activated via input from the keyboard using special keys and key sequence commands. In one implementation, on-screen cursor control device 1080 is a touch screen device incorporated with display device 1040 and capable of registering a position on display device 1040 where a stylus element makes contact.

Exemplary System

Figure 2A:
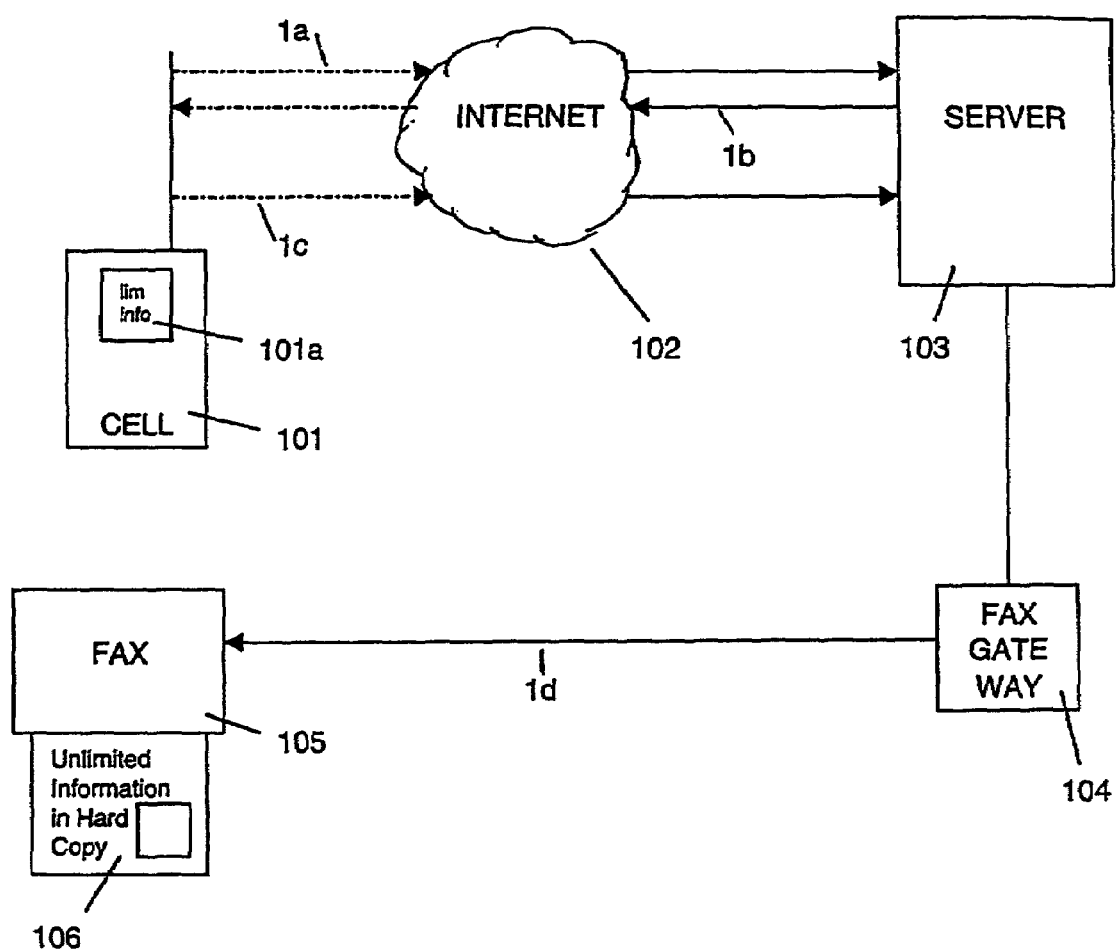
FIG. 2A depicts a system wherein device such as a cellular digital telephone produces a hard copy of information from a server on any facsimile system in one embodiment of the present invention.

An exemplary system for sending a facsimile transmission from a mobile communications device such as a cellular digital telephone is depicted in FIG. 2A. In one embodiment of the present invention, mobile device 101 may be in wireless communications with server 103 over the Internet 102. The user of mobile device 101, such as a cellular telephone, may transmit instructions, as in exemplary pathway (1a) to server 103 by controls on the mobile device, to access certain information. Server 103 correspondingly accesses the specified information and may convert it into a format compatible for display on mobile device 101, such as wireless markup language, (WML) or some other protocol. In one implementation, this conversion may be accompanied by simultaneous editing and compression to enable display on the mobile device 101 display mechanism 101A. This may be accomplished by using filtering software or other processes extant or yet to be developed. Server 103 may then transmit the information back to mobile device 101 over Internet 102, as in exemplary pathway (1b).

Mobile device 101 may display a representation of the information on an appurtenant display mechanism 101a. This displayed information may be a limited version of the specified information as available at the server. Upon viewing the information as displayed by mechanism 101a, the user may decide to embody a hard copy of the information. In one implementation of the present invention, the user may elect from several possibilities. The user may elect to: print a screenshot of the information as displayed on mobile device 101 by display mechanism 101a; to print out the entire corpus of specified information, as accessed by server 103; or to print related data referenced by the information accessed by server 103. The mobile device 101 may then communicate instructions to server 103, including the user's election, to print a hard copy 106, along with the telephone number of a facsimile system 105, as in exemplary pathway (1c). Any operational facsimile system anywhere, at any accessible telephone number, may be designated to print the hard copy 106.

Upon receipt of a hard copy printing and election command, server 103 may convert the information as specified, such as by rasterization, or by any other process known or to be developed, into a format compatible with facsimile transmission, including, but not limited to, G3 and TIFF standard facsimile protocols, in accordance with one embodiment of the invention. Upon conversion to a facsimile compatible format, server 103 may then transmit the information to any designated facsimile system 105 anywhere, at any accessible telephone number, in one implementation via a facsimile gateway 104, as in exemplary pathway (1d). Upon receipt of the transmitted data from the facsimile gateway 104, facsimile system 105 prints a hard copy 106 of the specified information. If the user elected to print only a screenshot of the information as it appeared at mobile device 101 on display mechanism 101a, then facsimile system 105 receives this screenshot as transmitted from server 103 and prints a hard copy 106 rendering a reproduction of the information as displayed at the mobile device 101, which may have been a limited version of the entire corpus of specified information available at server 103, perhaps only restricted alphanumeric and limited graphical information.

However, if the user elected to print the entire corpus of information available at server 103, facsimile system 105 receives this information as transmitted by server 103 and prints a hard copy 106 rendering the information as available at the server 103. Such information may include an entire webpage or document. Although the information displayed at mobile device 101 may have been a limited representation of the full corpus of information as specified to and available at the server 103, perhaps due to size and resolution restrictions of mobile device display mechanism 101*a*, hard copy 106 as printed by facsimile system 105 may more fully reproduce the information as it is available at server 103. This may include full document and webpage reproductions, including graphical information such as pictures and designs, as well as selections of font of alphanumerically rendered text.

It the user elected to print related data referenced by the information specified to the server 103, server 103 retrieves that referenced data, converts it into facsimile compatible format, and sends it via facsimile gateway 104. This may include another webpage or document. Upon receipt of this transmission, facsimile system 105 prints a hard copy 106 rendering the referenced information.

Figure 2B:
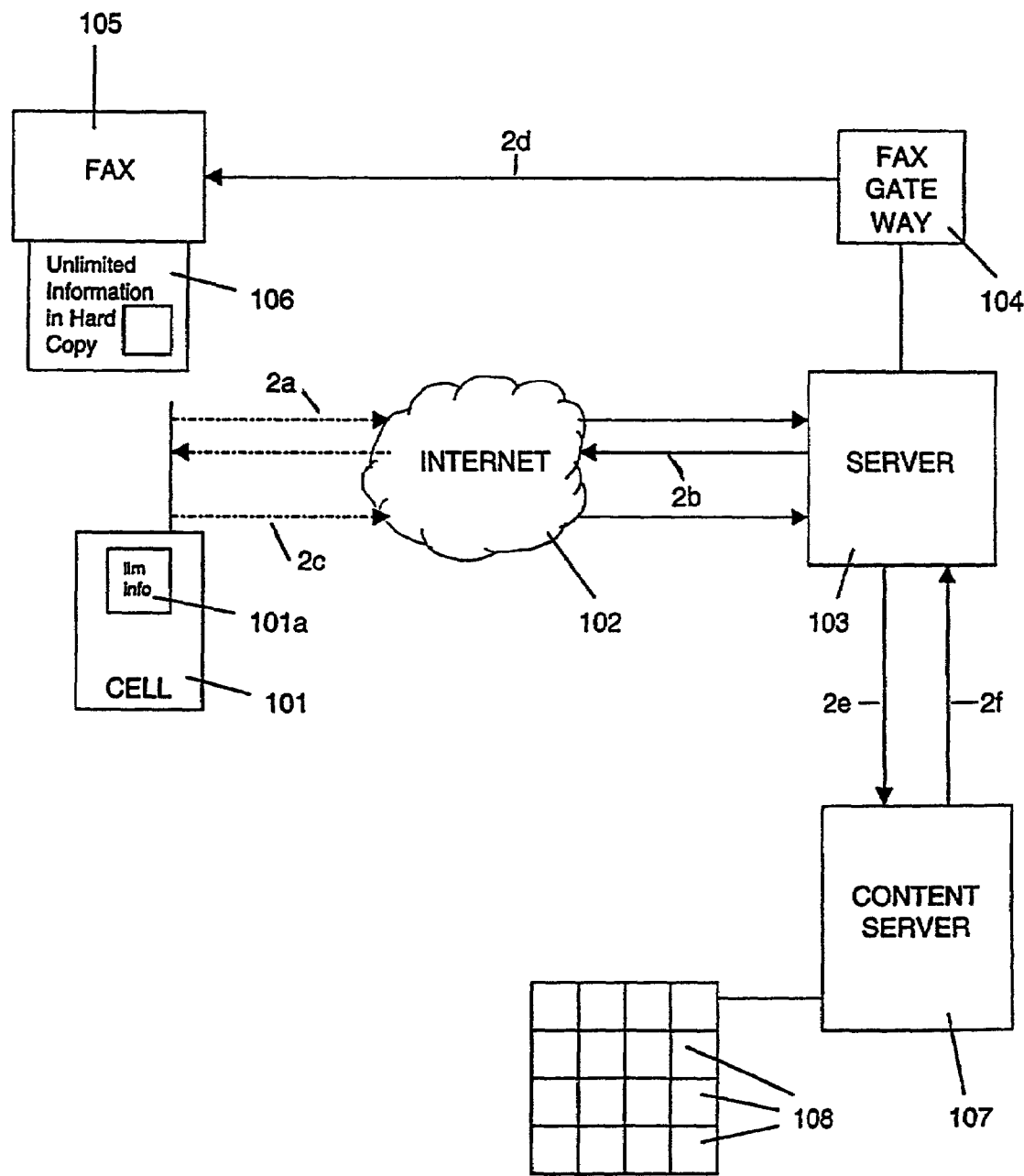
FIG. 2B depicts a system wherein a mobile device such as a cellular digital telephone produces a hard copy on a facsimile system of websites accessed via a server in one embodiment of the present invention.

FIG. 2B depicts an exemplary system for accessing and transmitting webpages by a mobile device for facsimile reproduction in accordance with one implementation of the present invention. A mobile device 101 such as a cellular digital telephone is in communication with server 103 via the Internet 102. A user sends a command to server 103 to access a particular webpage by designating by the webpage's unique universal resource locator (URL). The user may implement this designation by inputting the webpage URL into mobile device 101, as in exemplary pathway (2*a*). Upon receipt of this command, server 103 may contact content server 107, as in exemplary pathway (2*e*) and select for retrieval the designated webpage from among the webpages 108 accessible thereon, as in exemplary pathway (2*f*).

When the designated webpage has been retrieved, server 103 may edit and compress the information therein, convert it into a format compatible with transmission to and display at mobile device 101, and send it to mobile device 101, as in exemplary pathway (2*b*). Upon receiving the information, mobile device 101 may display it, perhaps in some limited version compatible with its display capability, upon display mechanism 101*a*. The user may view it there and decide to download and print a hard copy of the webpage in its entirely, including pictures and other graphical content and complete alphanumeric and other textual content at a facsimile system 105. If a decision to download and print the website is made, the user may transmit a facsimile command to server 103, as in exemplary pathway (2*c*) and may designate a facsimile system 105 by telephone number.

Upon receiving a facsimile command, server 103 converts the webpage information content into a facsimile compatible format and transmits the webpage thus converted to designated facsimile system 105, as in exemplary pathway (2*d*). Upon receipt of the transmission, facsimile system 105 downloads the webpage and prints a hard copy 106 of the full webpage information content, including full alphanumeric and other textual content and pictures and other graphical information.

Besides the designated webpage, other embodiments of the invention enable webpages referenced by the designated webpage to be transmitted by facsimile. Other embodiments allow designated documents to be printed as well. For example, a designated document may be transmitted by facsimile in this manner by reference to it as a PDF file.

EEXMPLARY MOBILE DEVICE—SERVER FACSIMILE TRANSMISSION METHODS

Figure 3:
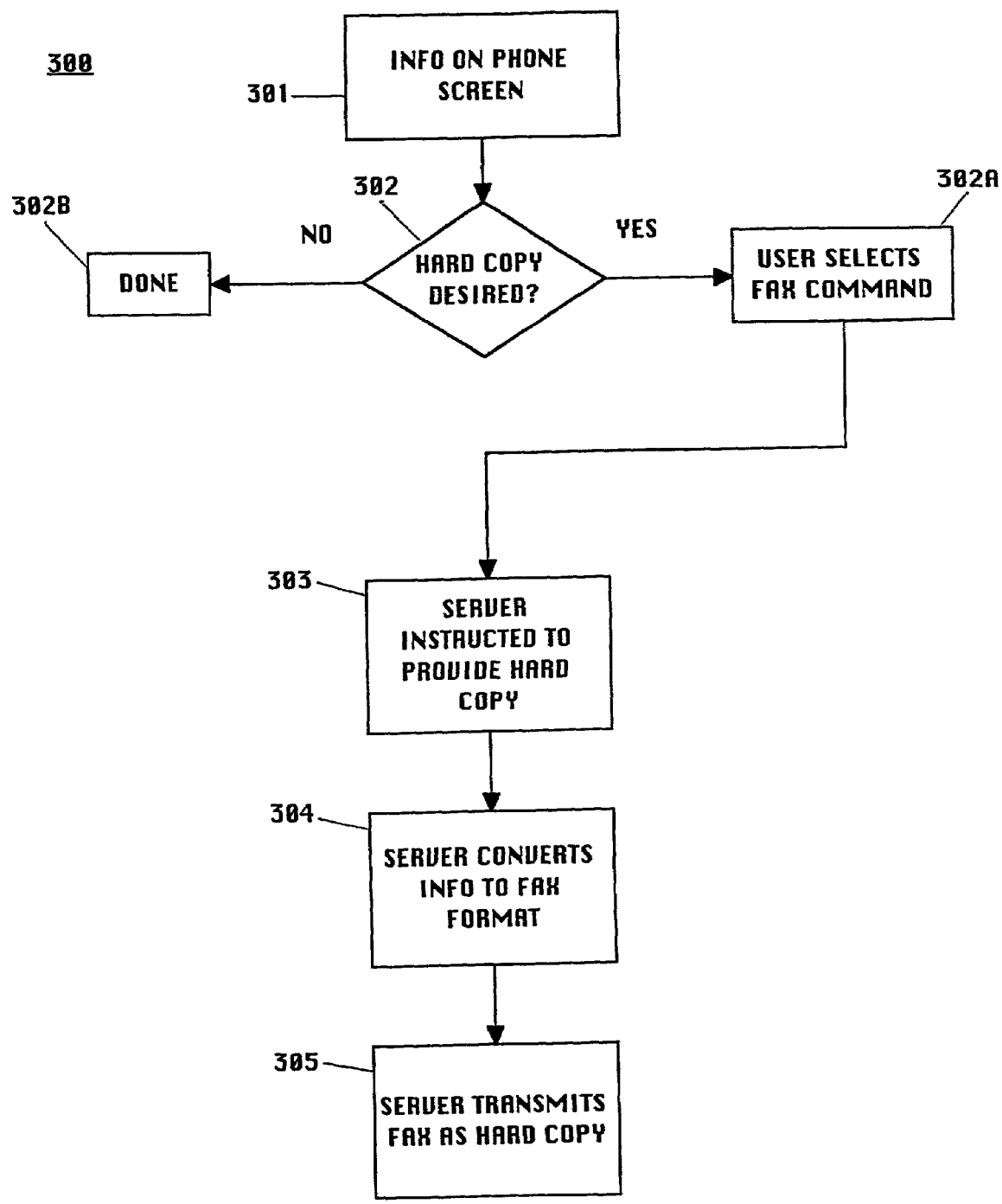
FIG. 3 is a flow chart of the steps in an exemplary process wherein a hard copy is produced by a facsimile system of information displayed on a mobile device in accordance with one embodiment of the present invention.

FIG. 3 is a flow chart of an exemplary process 300 wherein a mobile device user sends a facsimile transmission via a server in accordance with one embodiment of the present invention. The parts of process 300 executed by a server (e.g., server 103, FIGS. 1, 2A, 2B) can be implemented via computer-readable program instructions stored in a memory unit (e.g., memory 1010, FIG. 1) and/or data storage device (e.g., data storage device 1015, FIG. 1), and executed by a processor (e.g., processor 1050) in server 103.

Observing information accessed by a server (such as server 103, FIGS. 2A, 2B) on the display mechanism (such as display 101A, FIGS. 2A, 2B) of a mobile device (such as device 101, FIGS. 2A, 2B), step 301, the user decides if downloading and embodiment in a hard copy is desired, step 302. If not, no further activity occurs, step 302B. However, the user may decide to download and print a hard copy of the information (such as hard copy 106, FIGS. 2A, 2B), by facsimile transmission. If so, the user selects a "Fax" command using the mobile device 101, step 302A. This is transmitted to the server 103, and instructs the server 103 to provide a hard copy (such as hard copy 106, FIGS. 2A, 2B), step 303. Software with which the server 103 is programmed enables the server 103 to respond to this instruction accordingly, and to convert the information into a format compatible with facsimile transmission, step 304, such as by rasterization or by some other process, existing or yet to be developed. Such formats include, but are not limited to G3, TIFF, and other facsimile protocols. Upon conversion, the server 103 transmits the information by facsimile transmission.

Figure 4:
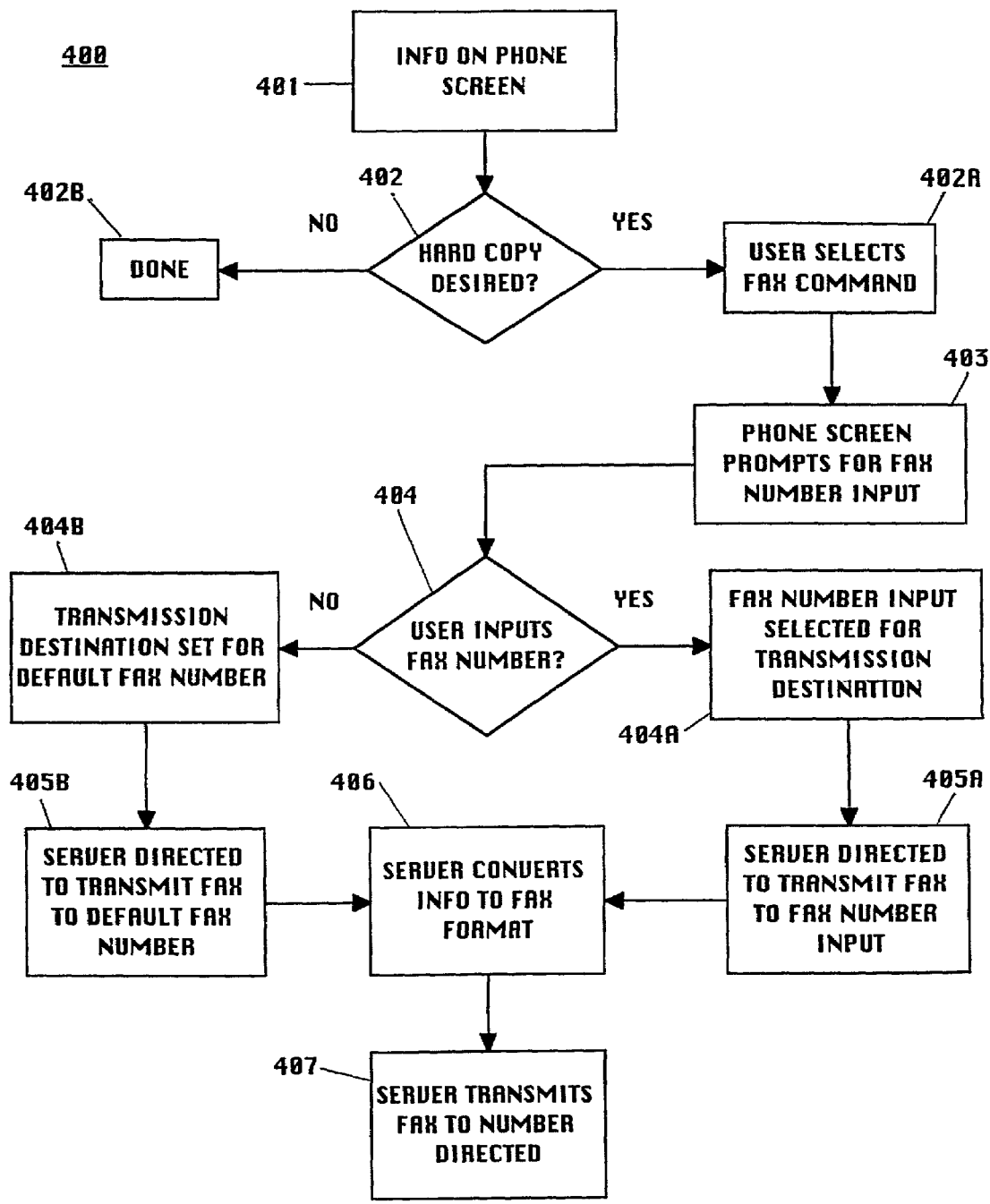
FIG. 4 is a flow chart of the steps in an exemplary process wherein a hard copy is produced of information displayed on a mobile device in accordance with one embodiment of the present invention on facsimile systems with any telephone number.

FIG. 4 is a flowchart of an exemplary process 400 wherein a mobile device user sends a facsimile transmission via a server in accordance with one embodiment of the present invention. The parts of process 400 executed by a server (e.g., server 103, FIGS. 1, 2A, 2B) can be implemented via computer-readable program instructions stored in a memory unit (e.g., memory 1010, FIG. 1) and/or data storage device (e.g., data storage device 1015, FIG. 1), and executed by a processor (e.g., processor 1050) in server 103.

Observing information accessed by a server (such as server 103, FIGS. 2A, 2B) on the display mechanism (such as display 101A, FIGS. 2A, 2B) of a mobile device (such as device 101, FIGS. 2A, 2B), step 401, the user decides if downloading and embodiment in a hard copy is desired, step 402. If not, no further activity occurs, step 402B. However, the user may decide to download and print a hard copy of the information (such as hard copy 106, FIGS. 2A, 2B), by facsimile transmission. If so, the user selects a "Fax" command using the mobile device, step 402A. The mobile device 101 responds to this fax command, with an on-screen display step 403, to prompt the user to enter a telephone number to designate the facsimile system (such as system 105, FIGS. 2A, 2B) to which transmission, and by which downloading and printing of hard copy (such as hard copy 106, FIGS. 2A, 2B), is desired.

If the user inputs a fax number into the mobile device, step 404, this number is sent to the server 103 to designate a destination facsimile system for corresponding facsimile transmission, step 404A. The server 103 will accordingly be instructed to transmit the information to this fax number, step 405A.

If the user decides in step 404 to download and print by a pre-selected facsimile system with a preset or programmed default telephone number, the default number is transmitted to the server 103, step 404B. Alternatively, another embodiment of the invention may have a default fax number programmed into the server 103. In either implementation, the server 103 is accordingly instructed to transmit the information to the default fax number.

Directed to transmit to a specified number, the server 103 converts the information retrieved into a format compatible with transmission by facsimile, step 406. Such formats include, but are not limited to G3, TIFF, and other facsimile protocols. Conversion may be accomplished by rasterizing the information, but may be done by other processes extant or yet to be developed. Upon conversion, the server 103 transmits the information by facsimile transmission to the designated number, step 407.

Figure 5:
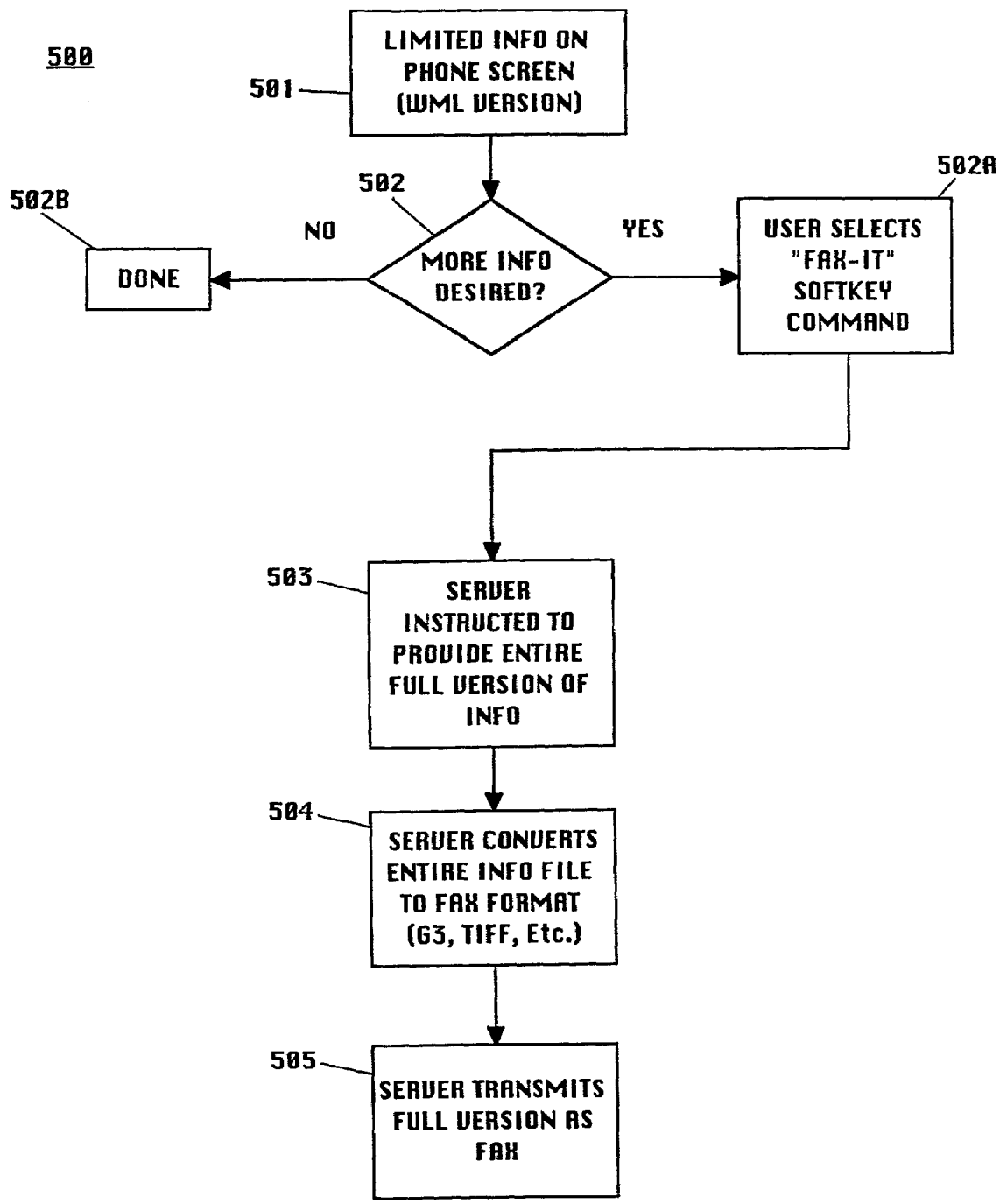
FIG. 5 is a flow chart of the steps in an exemplary process wherein a full body of available information of information displayed in limited format on a mobile device is transmitted by a server via facsimile in accordance with one embodiment of the present invention.
Figure 6:
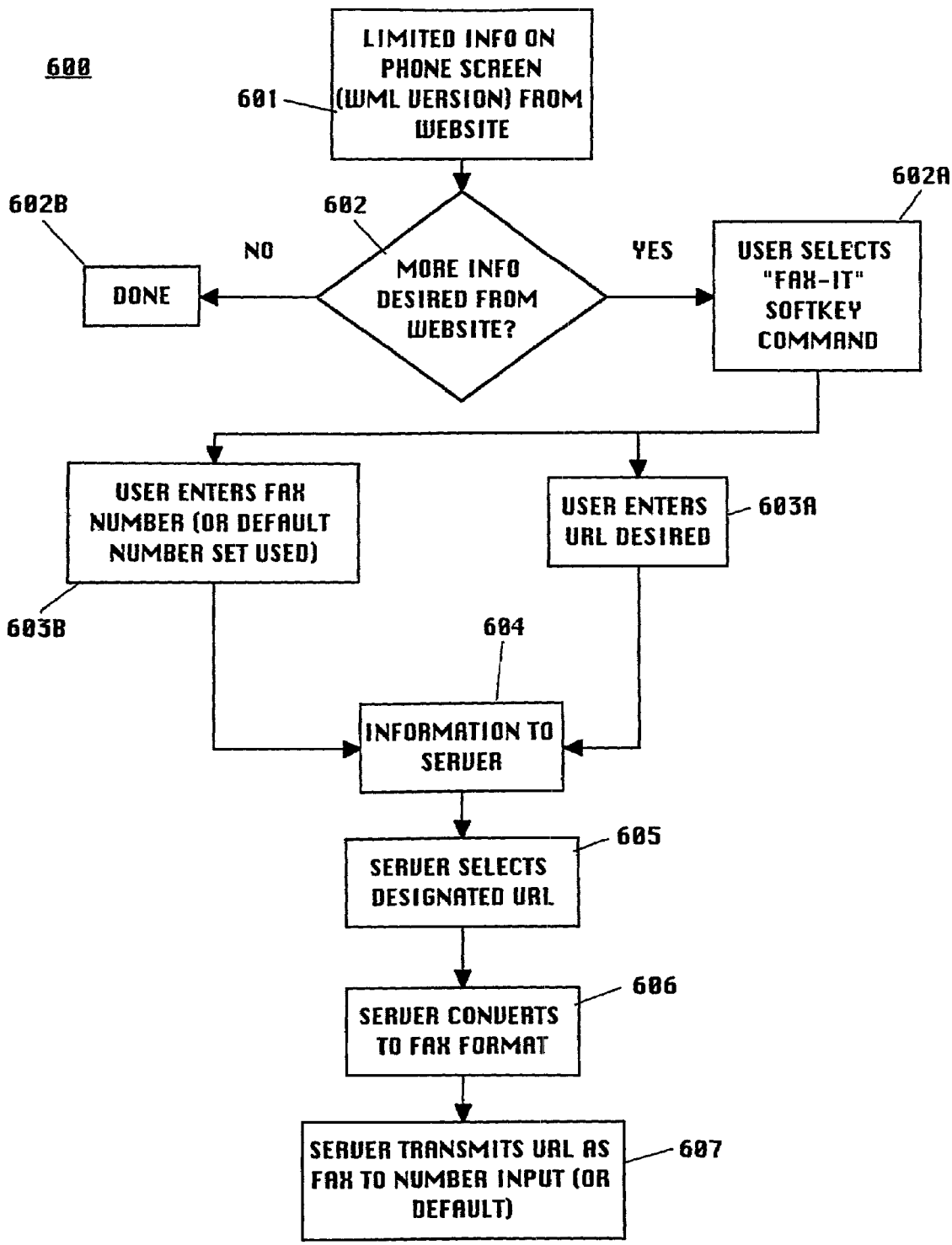
FIG. 6 is a flow chart of the steps in an exemplary process wherein the full content of a webpage or other information accessed by a mobile device in limited format is transmitted by a server by facsimile in accordance with one embodiment of the present invention.

FIG. 5 is a flowchart of an exemplary process 500 wherein a mobile device (such as device 101, FIGS. 2A, 2B) displaying information in limited format as provided by a server to download and embody in hard copy the complete version of such information, as available at the server 103, in accordance with one embodiment of the present invention. The parts of process 500 executed by a server (e.g., server 103, FIGS. 1, 2A, 2B) can be implemented via computer-readable program instructions stored in a memory unit (e.g., memory 1010, FIG. 1) and/or data storage device (e.g., data storage device 1015, FIG. 1), and executed by a processor (e.g., processor 1050) in server 103.

In step 501, information received from a server (such as server 103, FIGS. 2A, 2B) in wireless markup language (WML) version, or some other protocol, is displayed on a screen (such as display 1010A, FIG. 2A) appurtenant to a mobile device (such as device 101, FIGS. 2A, 2B), perhaps in some limited form, due to constraints of the display mechanism, as enabled by filtering software or other means. The user decides in step 502 if more information is desired. If not, no further actions occur, step 502B.

However, if the limited information displayed on-screen by the mobile device causes the user to decide in step 502 to download and print more information, such as the information in the entire form and content available at the server 103, the user may select a "Fax" command by the mobile device 101, step 502A. This command transmitted by the mobile device to the server instructs the server to provide the entire, full version of the information available at the server, step 503. Software with which the server 103 may be programmed causes the server 103 to respond to this instruction by rasterizing or otherwise converting the entire body of information into a format compatible with facsimile transmission, step 504. Such a format may be fax protocols such as G3 or TIFF, but are not so limited by the present invention. Further, any information available at the server 103 can be so converted, including but not limited to webpages, documents, and other data. Once converted, the server 103 executes step 505, transmitting the entire corpus of available information to any facsimile system (such as facsimile system 105, FIGS. 2A, 2B).

FIG. 600 is a flowchart of an exemplary process 600 wherein a mobile device (such as device 101, FIGS. 2A 2B) controls a server to transmit the entire contents of a website to a designated facsimile system, in accordance with one implementation of the present invention. The parts of process 600 executed by a server (e.g., server 103, FIGS. 1, 2A, 2B) can be implemented via computer-readable program instructions stored in a memory unit (e.g., memory 1010, FIG. 1) and/or data storage device (e.g., data storage device 1015, FIG. 1), and executed by a processor (e.g., processor 1050) in server 103.

In step 601, information from a website is received from a server (such as server 103, FIGS. 1, 2A, 2B) in wireless markup language (WML) version, or some other protocol, and displayed on a screen (such as display 101A, FIGS. 2A, 2B) appurtenant to a mobile device (such as device 101, FIGS. 2A, 2B) in some limited form. This is accomplished by processes enabled by filtering software, or by other methods extant or yet to be developed. The user decides in step 602 if more information is desired. If not, no further actions occur, step 602B.

However, if the website information displayed on-screen by the mobile device causes the user to decide to step 602 to download and print the entire webpage (such as webpages 108, FIG. 2B), such as is available in HyperText Markup Language (HTML) or some other format at the server 103, the user may select a "Fax" command by the mobile device 101, step 602A. In one embodiment, the server 103 is instructed accordingly to implement the following actions on the webpage 108 then being displayed on the mobile device 101. In another embodiment, the user designates this webpage 108, or a related or alternate webpage 108, by inputting the appropriate Universal Resource Locator (URL) to the mobile device 101, step 603A. In either embodiment, the user inputs a telephone number in step 603B to designate a facsimile system (such as facsimile system 105, FIGS. 2A, 2B) to download and print the webpage. In one embodiment, a default fax number may designate a preselected facsimile system, if no other number is entered. The URL, if entered, along with the fax number is sent in step 604 by the mobile device 101 to the server 103.

In step 605, the server may select the URL designated webpage 108. In step 606, the server rasterizes or otherwise converts the webpage 108 selected into a format compatible with facsimile transmission. Such formats may include facsimile protocols such as G3 or TIFF, but are not so limited by the present invention. The server then transmits the selected webpage 108 to the designated fax number, step 607.

Figure 7:
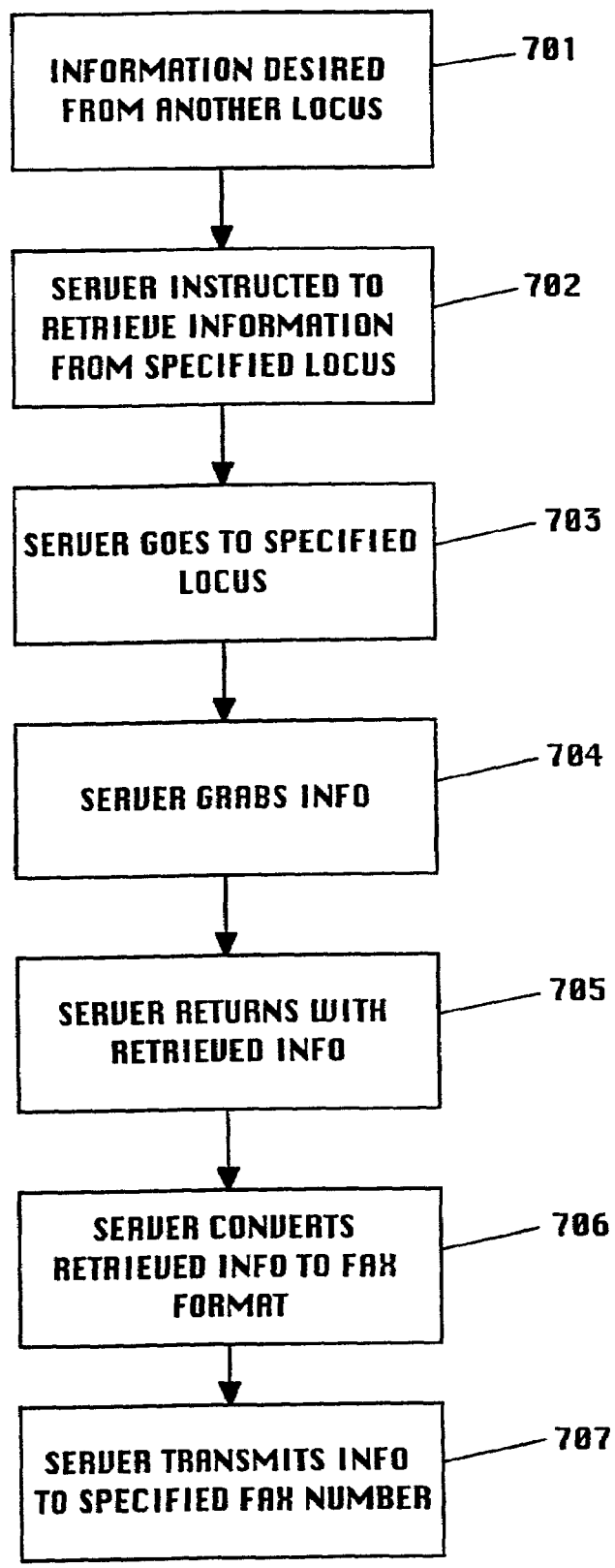
FIG. 7 is a flow chart of the steps in an exemplary process wherein information desired from another locus is transmitted via facsimile by a server under control of a mobile device in accordance with one embodiment of the present invention.

FIG. 7 is a flowchart of an exemplary process 700 by which a server (such as server 103, FIGS. 1, 2A, 2B) transmits specified information to a designated facsimile system (such as facsimile system 105, FIGS. 2A, 2B). The parts of process 300 executed by a server (e.g., server 103, FIGS. 1, 2A, 2B) can be implemented via computer-readable program instructions stored in a memory unit (e.g., memory 1010, FIG. 1) and/or data storage device (e.g., data storage device 1015, FIG. 1), and executed by a processor (e.g., processor 1050) in server 103.

A user of a mobile device (such as device 101, FIGS. 2A, 2B) desires information from another location, step 701. The user transmits instructions by the mobile device to a server (such as server 103, FIGS. 1, 2A, 2B) by which the server 103 is instructed to retrieve information from the specified source, step 702. In accordance with the instructions transmitted, and software routines with which it is programmed, the server 103 proceeds in step 703 to the specified location where the information may be found. In step 704, the server 103 may find the designated information and copy it, or may cause a content server (such as content server 107, FIGS. 2A, 2B) to send it to server 103, as in step 705.

Once retrieved, the information is converted by the server 103 into a facsimile compatible format, such as rasterization to G3 to TIFF or other protocols, although the present invention does not restrict conversion to these protocols. In step 707, the server 103 transmits the information to any designated facsimile system 105. It should be appreciated that the present invention, by this and other embodiments, may download and print to any operational facsimile system.

In another embodiment, the various information recently retrieved is brought up on a list, either stored in memory at the mobile device 101, or at the server 103, and selectively designated for conversion to facsimile format and transmission to facsimile system 105. The information so listed can be designated and faxed immediately upon retrieval of the list. Alternatively, the list can be stored, either at the server 103 or at the mobile device 101, in a form which can be recalled at a later time and faxed. In one embodiment of this implementation, the information stored at server 103 is stored in its pre-conversion format. In another embodiment, it is stored in its post-conversion, facsimile-compatible format.

In another embodiment of the present invention, a mobile device 101 provides voice-mail, or similar voice or speech content data to a user. The user decides to embody this information in a hard copy format (such as hard copy 106, FIGS. 2A, 2B), and does so by sending the fax command. The information provided to server 103 identifying the information content to be so embodied, in this case the voice or speech content data, is converted by server 103 to a facsimile compatible format and transmitted to facsimile system 105 (FIGS. 2A, 2B), where it is embodied as a hard copy 106.

In summary, in accordance with an implementation of the present invention, a user of a mobile device may access more information than the mobile device is itself capable of displaying, may access various types of information from any information source, and attains a capability of downloading information into hard copy anywhere, while not limiting mobility, through any operational facsimile system.

The preferred embodiment of the present invention, a method and system for sending facsimile transmissions from mobile devices via a server, is thus described. While the present invention has been described in particular embodiments, it should be appreciated that the present invention should not be construed as limited by such embodiments, but rather construed according to the following claims.

What is claimed is:

1. A method comprising:
sending viewable data to a mobile device, where the mobile device is configured to display at least a portion of the viewable data;
receiving a facsimile command at a networking device from the mobile device responsive to sending the viewable data to the mobile device, the facsimile command to identify one or more printable documents associated with the viewable data and to identify a facsimile endpoint to receive at least one of the printable documents;
retrieving at least one of the printable documents from a content server located externally to the networking device responsive to the facsimile command received from the mobile device;
converting the printable content into a form compatible with facsimile transmission responsive to the facsimile command; and
transmitting the converted printable content to the facsimile endpoint identified from the facsimile command, where the facsimile endpoint is configured to print a hard copy of the converted printable document.

2. The method as recited in claim 1 further comprising:
retrieving the viewable data from the content server responsive to a request from the mobile device; and
formatting the viewable data into a form compatible with the mobile device prior to sending the data to the mobile device for display.

3. The method as recited in claim 1 where the printable document received from the content server is a webpage; and receiving a Universal Resource Locator (URL) designating the webpage from the mobile device in the facsimile command prior to retrieving the printable document from the content server.

4. The method as recited in claim 1 where the printable document received from the content server is at least one of a webpage, a file, a document, a graphics file, a spreadsheet, a database, an e-mail, a voice-to-text file, or a voice-to-e-mail file.

5. The method as recited in claim 1 further comprising:
receiving a facsimile number in the facsimile command that identifies the facsimile endpoint as a transmission destination.

6. The method as received in claim 1 sending the converted printable document to the facsimile endpoint associated with a default number stored locally.

7. A server system comprising:
a bus;
a communication interface coupled to said bus, said communication interface operable to communicatively couple with a mobile device and a facsimile system;
a processor coupled to said bus, said processor adapted to:
send viewable data to a mobile device, where the mobile device is configured to display at least a portion of the viewable data;
receive a facsimile command from the mobile device responsive to sending the viewable data to the mobile device, the facsimile command to identify one or more printable documents associated with the viewable data and to identify a facsimile endpoint to receive at least one of the printable documents;
retrieve at least one of the printable documents from a content server separate from the processor responsive to the facsimile command received from the mobile device;
convert the printable document into a form compatible with facsimile transmission responsive to the facsimile command; and
transmit the converted printable document to a facsimile gateway, the facsimile gateway to route the converted printable document to the facsimile endpoint identified from the facsimile command, where the facsimile endpoint is configured to print a hard copy of the converted printable document.

8. The server system as recited in claim 7 wherein said method further comprises:
retrieving the viewable data from the content server responsive to a request from mobile device; and
formatting the viewable data into a form compatible with the mobile device prior to sending the data to the mobile device for display.

9. The server system as recited in claim 7 where the printable document received from the content server is a webpage;
receiving a Universal Resource Locator (URL) designating the webpage from the mobile device in the facsimile command prior to retrieving the printable document from the content server.

10. The server system as recited in claim 7 where the printable document received from the content server is at least one of a webpage, a file, a document, a graphics file, a spreadsheet, a database, an e-mail, a voice-to-text file, or a voice-to-e-mail file.

11. The server system as recited in claim 7 wherein said method further comprises:

receiving a facsimile number in the facsimile command that identifies the facsimile endpoint as a transmission destination.

12. The method as recited in claim 7 sending the converted printable document to the facsimile endpoint associated with a default facsimile number stored locally.

13. A method comprising:
sending a request for viewable data to server system;
receiving the viewable data responsive to the request;
displaying at least a portion of the viewable data in a display window; and
sending a facsimile instruction to the server system responsive to the displaying, the facsimile instruction to request the server system retrieve one or more printable documents from a content server, convert the printable document into a form compatible with facsimile transmission, and transmit the converted printable document to a facsimile endpoint without providing a facsimile number associated with the facsimile endpoint in the facsimile instruction, where the facsimile endpoint is configured to print a hard copy of the converted printable document.

14. The method as recited in claim 13 further comprising instructing said server system to transmit a webpage.

15. The method as recited in claim 14 wherein said webpage is designated by a corresponding Universal Resource Locator (URL).

16. The method as recited in claim 13 where the printable document received from the content server is at least one of a webpage, a file, a document, a graphics file, a spreadsheet, a database, an e-mail, a voice-to-text file, or a voice-to-e-mail file.

17. The method as recited in claim 13 further comprising:
sending an location indicator in the facsimile instruction that identifies a default facsimile number stored within the servers system, where the default facsimile number corresponds to the facsimile endpoint.

18. A computer-usable medium having a computer-readable program code embodied therein for causing a computer system to perform a process comprising:
sending viewable data to a mobile device, where the mobile device is configured to display at least a portion of the viewable data;
receiving a facsimile command from the mobile device responsive to sending the viewable data to the mobile device, the facsimile command to identify one or more printable documents associated with the viewable data and to identify a facsimile endpoint to receive at least one of the printable documents;
retrieving at least one of the printable documents from a content server separate from the computer system responsive to the facsimile command received from the mobile device;
converting the printable content into a form compatible with facsimile transmission responsive to the facsimile command; and
transmitting the converted printable content to a facsimile gateway, the facsimile gateway to route the converted printable content to the facsimile endpoint identified form the facsimile command,
where the facsimile endpoint is configured to print a hard copy of the converted printable document.

19. The computer-usable medium as recited in claim 18 wherein said computer-readable program code embodied therein further causes a computer system to perform a processing comprising:

retrieving the viewable data from the content server responsive to a request from the mobile device; and
formatting the viewable data into a form compatible with the mobile device prior to sending the data to the mobile device for display.

20. The computer-usable medium as recited in claim 18 where the printable document received from the content server is a webpage;
receiving a Universal Resource Locator (URL) designating the webpage from the mobile device in the facsimile command prior to retrieving the printable document from the content server.

21. The computer-usable medium as recited in claim 18 where the printable document received from the content server is at least one of a webpage, a file, a document, a graphics file, a spreadsheet, a database, an e-mail, a voice-to-text file, or a voice-to-e-mail file.

22. The computer-usable medium as recited in claim 18 wherein said computer system is communicatively coupled to said mobile device via a wireless network.

23. The computer-usable medium as recited in claim 22 wherein said wireless network includes the Internet.

24. The computer-usable medium as recited in claim 18 wherein said computer-readable program code embodied therein further causes said computer system to perform:
receiving a facsimile number in the facsimile command that identifies the facsimile endpoint.

25. A system comprising:
means for sending viewable data to a mobile device, where the mobile device is configured to display at least a portion of the viewable data;
means for receiving a facsimile command from the mobile device responsive to sending the viewable data to the mobile device, the facsimile command to identify one or more printable documents associated with the viewable data and to identify a facsimile endpoint to receive at least one of the printable documents;
means for retrieving at least one of the printable documents from a content server located externally to the system responsive to the facsimile command received from the mobile device;
means for converting the printable content into a form compatible with facsimile transmission responsive to the facsimile command; and
means for transmitting the converted printable content to a facsimile gateway, the facsimile gateway to route the converted printable content to the facsimile endpoint identified from the facsimile command, where the facsimile endpoint is configured to print a hard copy of the converted printable document.

26. The system as recited in claim 25 further comprising:
means for retrieving the viewable data from the content server responsive to a request from the mobile device; and
means for formatting the viewable data into a form compatible with the mobile device prior to the means for sending transmitting the data to the mobile device for display.

27. The system as recited in claim 25 wherein said second information comprises data displayed on said mobile device.

28. The system as recited in claim 25 where the printable document received from the content server is a webpage;
means for receiving a Universal Resource Locator (URL) designating the webpage from the mobile device in the facsimile command prior to the retrieving the printable document from the content server.

29. The system as recited in claim 25 where the printable document received from the content server is at least one of a webpage, a file, a document, a graphics file, a spreadsheet, a database, an e-mail, a voice-to-text file, or a voice-to-e-mail file.

30. The system as recited in claim 25 wherein said system is communicatively coupled to said mobile device via a wireless network.

31. The system as recited in claim 30 wherein said wireless network includes the Internet.

32. The system as recited in claim 25 further comprising:
means for receiving a facsimile (Fax) number in the facsimile command that identifies the facsimile endpoint as a transmission destination.

33. The system as recited in claim 32 further comprising means of transmitting by facsimile to said designated facsimile (Fax) number.

34. A method comprising:
retrieving viewable data from a content server responsive to a request from a mobile device; and
formatting the viewable data into a form compatible for display on the mobile device;
sending viewable data to the mobile device, where the mobile device is configured to display at least a portion of the viewable data;
receiving a facsimile command from the mobile device responsive to sending the viewable data to the mobile device, the facsimile command to identify one or more printable documents associated with the viewable data and to identify a facsimile endpoint to receive at least one of the printable documents;
retrieving at least one of the printable documents from the content server responsive to the facsimile command received from the mobile device;
converting the printable content into a form compatible with facsimile transmission responsive to the facsimile command wherein said formatting is performed by said server system, wherein said facsimile compatible format comprises one or more of the G3 and TIFF protocols; and
transmitting said second information to any facsimile system communicatively accessible with said server system, and wherein said facsimile system functions as an accessible printer device for said mobile device, for printing a hard copy of said second information effectively instantaneously;
transmitting the converted printable content to the facsimile endpoint identified from the facsimile command, where the facsimile endpoint is configured to print a hard copy of the converted printable document.

* * * * *

UNITED STATES PATENT AND TRADEMARK OFFICE
CERTIFICATE OF CORRECTION

PATENT NO. : 7,272,390 B1
APPLICATION NO. : 09/741316
DATED : September 18, 2007
INVENTOR(S) : Stephen Adachi et al.

It is certified that error appears in the above-identified patent and that said Letters Patent is hereby corrected as shown below:

| | |
|---|---|
| Column 2, line 9: | Replace "serves" with -- servers --; |
| Column 2, line 38: | Replace "or" with -- of --; |
| Column 2, line 40: | Replace "teach" with -- teacher --; |
| Column 2, line 67: | After "to" insert -- display information such as very small alphanumeric characters or graphical --; |
| Column 3, line 24: | Replace "teach" with -- teacher --; |
| Column 3, line 26: | Replace "devices" with -- device --; |
| Column 5, line 16: | After "wherein" insert -- a mobile --; |
| Column 6, line 11: | Replace "are" with -- as --; |
| Column 6, line 36: | Replace "on" with -- and --; |
| Column 6, line 51: | Replace "SSYSTEM" with -- SYSTEM --; |
| Column 6, line 64: | Replace "vehicle" with -- viable --; |
| Column 8, line 13: | Replace "language," with -- language --; |
| Column 9, line 10: | Replace "font of" with -- font for --; |
| Column 9, line 12: | Replace "It" with -- If --; |
| Column 9, line 23: | Replace "communication" with -- communications --; |

Signed and Sealed this

Thirtieth Day of November, 2010

David J. Kappos
*Director of the United States Patent and Trademark Office*

CERTIFICATE OF CORRECTION (continued)
U.S. Pat. No. 7,272,390 B1

| | |
|---|---|
| Column 9, line 43: | Replace "entirely," with -- entirety, --; |
| Column 9, line 64: | Replace "EEXMPLARY" with -- EXEMPLARY --; |
| Column 11, line 25: | Replace "1010A," with -- 101A, --; |
| Column 11, line 52: | Replace "2A 2B)" with -- 2A, 2B) --; |
| Column 12, line 6: | Replace "decide to" with -- decide in --; |
| Column 12, line 57: | Replace "G3 to" with -- G3 or --; |
| Column 14, line 14 (Claim 6): | Replace "received" with -- recited --; |
| Column 14, line 16 (Claim 6): | After "default" insert -- facsimile --; |
| Column 14, lines 17-45 (Claim 7): | Delete Claim 7 in its entirety and replace with the following re-formatted Claim 7: |

-- 7. A server system comprising:

a bus;

a communication interface coupled to said bus, said communication interface operable to communicatively couple with a mobile device and a facsimile system;

a processor coupled to said bus, said processor adapted to:

send viewable data to a mobile device, where the mobile device is configured to display at least a portion of the viewable data;

receive a facsimile command from the mobile device responsive to sending the viewable data to the mobile device, the facsimile command to identify one or more printable documents associated with the viewable data and to identify a facsimile endpoint to receive at least one of the printable documents;

retrieve at least one of the printable documents from a content server separate from the processor responsive to the facsimile command received from the mobile device;

convert the printable document into a form compatible with facsimile transmission responsive to the facsimile command; and transmit the converted printable document to a facsimile gateway, the facsimile gateway to route the converted printable document to the facsimile endpoint identified from the facsimile command, where the facsimile endpoint is configured to print a hard copy of the converted printable document. --;

CERTIFICATE OF CORRECTION (continued)
U.S. Pat. No. 7,272,390 B1

| | |
|---|---|
| Column 14, line 50 (Claim 8): | After "from" insert -- the --; |
| Column 14, line 56 (Claim 9): | After "webpage;" insert -- and --; |
| Column 15, line 60 (Claim 18): | Replace "form" with -- from --; |
| Column 15, line 67 (Claim 19): | Replace "processing" with -- process --; |
| Column 16, line 8 (Claim 20): | After "webpage;" insert -- and --; |
| Column 16, line 27 (Claim 24): | Replace "endpoint." with -- endpoint as a transmission destination. --; |
| Column 16, line 63 (Claim 28): | After "webpage;" insert -- and --; and |
| Column 18, line 11 (Claim 34): | Replace "command" with -- command, --. |